Feb. 23, 1926. 1,574,384
J. C. GARNER
MECHANISM FOR CLEANING COTTON FIBERS
Filed August 30, 1921 3 Sheets-Sheet 1
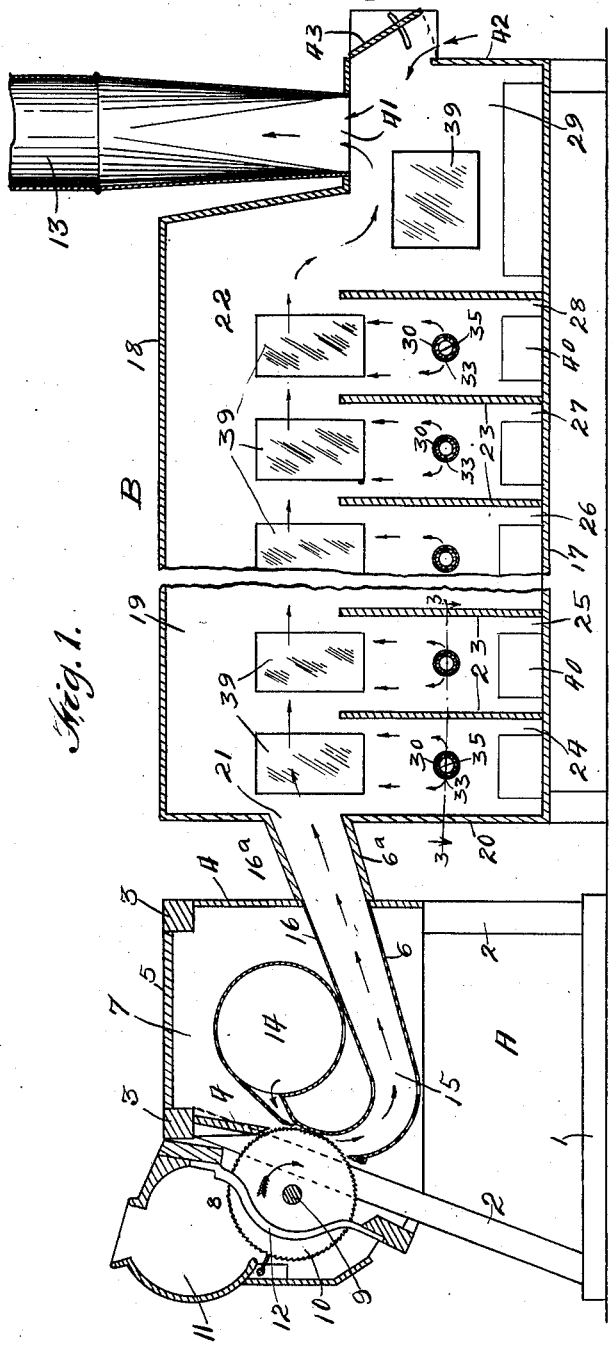
INVENTOR.
James C Garner
BY
J H H Bliss
ATTORNEY.

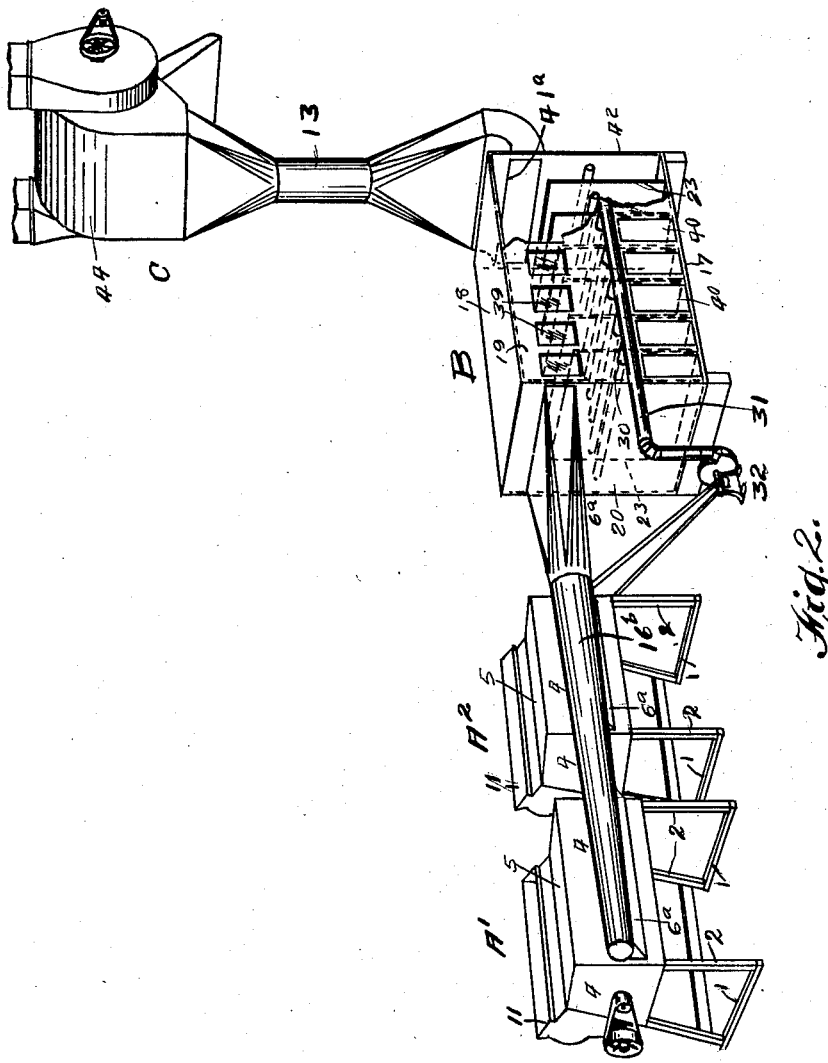

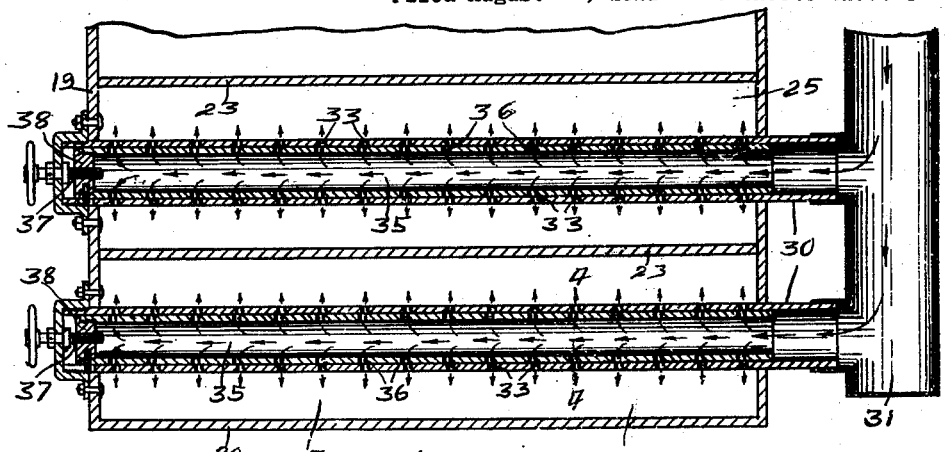
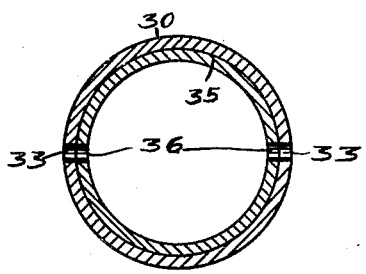

Patented Feb. 23, 1926.

1,574,384

UNITED STATES PATENT OFFICE.

JAMES C. GARNER, OF HOUSTON, TEXAS.

MECHANISM FOR CLEANING COTTON FIBERS.

Application filed August 30, 1921. Serial No. 496,872.

*To all whom it may concern:*

Be it known that I, JAMES C. GARNER, a citizen of the United States, residing at Houston, in the county of Harris and State of Texas, have invented certain new and useful Improvements in Mechanisms for Cleaning Cotton Fibers, of which the following is a specification, reference being had therein to the accompanying drawing.

This invention relates to improvements in mechanisms for cleaning cotton fibers or separating them from small foreign particles, as well as from larger bodies, after masses of the cotton have had their fibers more or less separated from each other. The object is to provide a much simpler mechanism for this purpose than those heretofore used, and one by which the cleaning and separating of the cotton can be carried to a higher degree than has been heretofore attainable.

Fig. 1 shows a longitudinal section of a cotton cleaning and separating mechanism embodying my improvements, the illustration being more or less conventional in character.

Fig. 2 is a perspective view illustrating the manner of connecting the separating mechanism up to each of a plurality of ginning or re-ginning machines.

Fig. 3 is a horizontal section on the line 3—3 of Fig. 1, the parts being illustrated on a larger scale.

Fig. 4 is a cross section on the line 4—4 of Fig. 3.

A indicates, as an entirety, the mechanism to the action of which the masses of cotton are preliminarily subjected. It may be a ginning mechanism of any suitable sort operating primarily for the separation of the seed from the fibers. These generally include a cylinder or drum formed by arranging closely together a plurality of toothed saw disks together with a counterpart element having slots or passageways for the saws respectively, the latter being adapted to carry through the cotton fiber while the seeds are stopped and forced downward. Many of these gins, in modern practice, are provided with supplemental cleaning devices designed for separating motes, foreign particles, knots or clumps of fiber, etc.

Or the element indicated at A may be a machine of the re-gin class; that is to say one that, in modern practice, is used for treating masses of cotton which, from one cause or another, are unfit for market or are in a more or less inferior condition. A cotton mass of the sort just referred to may be composed of sub-masses which have been previously ginned for seed separation but which, by exposure, on the ground, or in warehouses, have become commingled with particles of foreign material or which, from weather exposure, have become discolored or dampened. These re-gin machines are designed to open up the sub-masses of cotton forming one of these inferior masses, and to remove the relatively large particles, foreign to the cotton fibers, such as the remaining seeds, and then, while the fibers are still in contact with the saw disks, to further purify by separating the motes and smaller particles, together with the clots or unopened lumps of cotton fiber. That is to say, both in gins and re-gins, as heretofore made, there have been present, to co-act with the saws, supplemental devices (such as screens, of various forms, baffle boards, or partition walls, or pneumatically acting parts arranged to deliver air currents at the peripheries of the saws), with the intention of taking out from the fiber the smaller foreign particles, motes, fiber clots, etc.

But it is well known that the purification of the fiber, (that is the complete final separation of it from the small foreign particles, such as those just enumerated) has been imperfect.

The mechanisms, typified by that indicated conventionally at A, which I use (whether for ginning or re-ginning) do not include among their elements many of the mechanical devices heretofore combined with, or positioned close to, the saw cylinders (forming parts of the gins or re-gins) for the final separation of foreign particles, motes, grit, trash, or the like. In the present case the cotton fibers, after being separated from each other and from the larger foreign particles, such as seeds or the like, are taken, together with the finer foreign particles, immediately away from the cylinder and are transported to remote points for effecting the final cleaning.

B indicates that part of the apparatus in which the finer foreign materials are separated from the fibers. They are taken out in graduated masses, the lint fibers, themselves, being finally removed.

C indicates the suction element of the pneumatic mechanism by which the fibers and smaller foreign particles (taken from the initial mass by the cylinder) are transported to and through the separator element B.

As conventionally indicated, the parts of the first element A of the apparatus include a frame having base bars 1, uprights 2 and cross girts 3. In the upper part of this frame there is formed a housing having vertical walls 4, a top 5 and a bottom wall 6 enclosing a chamber 7. A saw cylinder 8 is mounted on a shaft 9 along the front side of the chamber 7, the saws being indicated at 10. Above the saw cylinder 8 is the hopper 11 for initially receiving the material that is to be treated. The curved bars 12 are combined with the saws, each being arranged between one saw disk and the next. The teeth of the saws engage with the fibers at the bottom part of the cotton mass in the hopper and draw them through the spaces between the sides of the disks respectively and the adjacent bars 12; the seeds and other large foreign particles being held back by the bars while the small particles, motes, grit, fiber clots, etc., are drawn through by the teeth.

This part of the apparatus being well understood, a description of the parts and operation is not necessary.

When the mechanism A is a re-gin, the mass in the hopper may include cotton, of various grades, or include sub-masses in various conditions, some of them being dry, open and free, while others may be compacted into relatively large clots; and all being more or less charged with foreign particles commingled with them.

The fibers separated by the saw disks, together with the fine foreign particles, are removed from the saws by currents of air compelled by suction devices, which exhaust from the duct 13, to travel from the saws to said duct; the air being delivered from a duct 14 through which it is forced by a positively acting blast apparatus. The fibres and fine particles travel from the saws through a duct 15 above the bottom 6 and enclosed by a suitable top wall 16, and through any necessary extension of this duct as at 6a, 16a. The air is forced into and through a relatively large chamber B. It is regulated, as closely as possible, to sustain the cotton lint fiber as it moves through this chamber into the escape duct. The foreign particles initially commingled with the fiber being relatively heavy, settle away from it. These foreign particles are of several specific gravities. And I permit them to settle away from the lint in graduated masses varying in accordance with their gravities.

The separator B is formed with the bottom 17, a top or cover 18, side wall 19 and end wall 20, with an opening 21 for an entrance flue.

The lower part of the chamber 22 is divided by partitions 23 into a series of sub-chambers 24 to 29, inclusive. The partitions 23 are extended upward to the proper horizontal lines and are so situated as to allow the heavier particles carried by the air to settle between them. The heavier particles settle into the chamber 24, the next lighter particles in the chamber 25, and so on until the fine, dusty material is caught at 29.

To provide for a supplemental regulation of the air and insure that the minutest of the lint fibers shall not settle downward, I supply streams of air to the interiors of each chamber 24, 25, etc.

30 indicates air tubes, each extending horizontally into and across one of the sub-chambers. They are shown to communicate with a supply manifold 31, which is connected to a blast device at 32. The air forced into the duct 30 escapes therefrom through apertures 33. This air rises upward through the chamber and prevents the lint from settling. Preferably, the apertures 33 are so arranged that the air tends to escape on horizontal lines, and they thus insure an upward rising mass of air in each chamber, which will cover the entire area.

With each air delivery tube 30 is combined a regulating device. This may be a valve at the air receiving end to control the quantity and rate of air feed from the manifold 31. But to insure a regulating of the entering air uniformly throughout the entire chamber, I prefer devices such as those shown in Figs. 3 and 4. Within each tube 30 there is loosely fitted a tube 35 having apertures 36, adapted to partially or completely register with the apertures 33. Each inner tube is moved, for air adjusting purposes, by the hand actuated threaded rod 37, and nut at 38.

The manual devices for effecting the adjustments of all of the air delivering means are on the outside of the walls of the chamber 22. For each sub-chamber 24, 25, etc., an inspection window is provided in the side walls of the separator chamber.

For the removal of the masses of materials which accumulate at the bottoms of the sub-chambers, doors or hand-holes with closures, at 40, are provided. The receiving end 41 of the exhaust duct 13 is positioned relatively low in order to cause a deflection downward of the stream of air before carrying the fiber upward, in order to insure the separation, finally of the lightest of the foreign particles; these collecting in the sub-chamber 29.

To control the force and volume of the air turning to and rising in the exhaust ducts, I provide, in the end wall 42 of the settling chamber a valve 43. This can be adjusted and positioned to have all of the air which enters the suction duct 13 come from the settling chamber, or to permit air to enter from the atmosphere to secure the regulation referred to.

The manner of operating an apparatus such as described will be readily understood from what I have above set forth. From the cotton initially placed in the hopper 11 the saws 10 separate the fibers and carry them, together with the fine foreign particles, to the air streams supplied by the duct 14 and drawn through the duct 15. The commingled materials carried by the air draft through the separator B separate from each other as they pass through it under the actions of the specific gravities. The settling of cotton lint is prevented by the regulable air currents introduced into the bottoms of the sub-chambers. The finally purified cotton is taken away by the pneumatic suction through the duct 13.

What I claim is:

1. The herein described method of treating cotton fibers, it consisting in supplying cotton in a mass, separating the fibers in said mass from each other and loosening them relative to motes, grit and foreign particles commingled therewith, suspending said fibers and foreign particles in a stream of air, directing the said stream along a horizontally elongated confined pathway, causing the air stream to carry the fibers in suspension from one end of said horizontal pathway to the other, permitting the said foreign particles to separate from the fibers and fall therefrom by gravity while the fibers are traveling along said horizontal pathway, providing air streams directed across the path of the fibers to supplement the supporting action of said first mentioned stream of air, and finally withdrawing the fibers through a duct communicating with said pathway.

2. The herein described method of cleaning cotton fibers, it consisting in supplying cotton in a mass, separating the fibers of said mass from each other and loosening them relative to motes, grit and foreign particles commingled therewith, suspending said fibers and foreign particles in a stream of air, directing the said stream along a horizontally elongated enclosed pathway, causing the air to carry the fibers in suspension from one end of said horizontal pathway to the other, then withdrawing the fibers through a duct communicating with the pathway, permitting the foreign particles to separate from the fibers and fall therefrom by gravity while they are traveling along said pathway, and causing supplemental streams of air to pass upward from points below said pathway to assist in suspending the fibers.

3. The herein described method of cleaning cotton fibers, it consisting in supplying cotton in a mass, separating the fibers of the said mass from each other and loosening them relative to motes, grit and foreign particles commingled therewith, suspending said fibers and foreign particles in a stream of air, directing the said stream along a horizontally elongated enclosed pathway, causing the air stream to carry the fibers in suspension from one end of said pathway to the other, permitting the foreign particles to separate from the fibers and fall therefrom by gravity while the fibers are traveling along said pathway, and causing a series of supplemental streams of air varying in force and volume to pass upward from points below said pathway.

4. The combination of the devices for taking cotton fibers from a mass of cotton and separating them from each other and from seed and relatively large particles of foreign materials commingled with the mass, a duct for finally receiving said fibers, means enclosing an elongated horizontal pathway between the aforesaid separating means and said duct, and a pneumatic mechanism arranged to cause a stream of air to take the fibers and the smaller particles of foreign materials together along said pathway and sustain the fibers until they reach and pass into said duct, and supplemental pneumatic means directed across said pathway for floating said fibers as they travel along said pathway, the devices which form the pathway being constructed and arranged to permit said particles of foreign material to separate by gravity from the fibers and fall therefrom while they are passing to said duct.

5. The combination with the devices for taking cotton fibers from a mass of cotton and separating them from each other and from seed and relatively large particles of foreign materials, a duct for finally receiving said fibers, means enclosing an elongated horizontal pathway between the aforesaid separating means and said duct, a pneumatic mechanism arranged to cause a stream of air to move from the initial separating means along said pathway and through said duct, the devices which form said pathway being arranged to permit the relatively smaller particles of foreign materials to separate by gravity from the fibers while the latter are approaching said duct, and supplemental pneumatic means acting transversely of said pathway for floating said fibers and supplementing the supporting action of said stream of air.

6. The combination with the fiber-separating saws, and the duct for finally receiving the fibers, of means enclosing a relatively elongated horizontal pathway between the aforesaid saws and said duct, a pneumatic mechanism arranged to cause a stream of fiber-sustaining air to take from the saws the fibers and the smaller particles of foreign materials commingled therewith along said pathway, the said devices which define the pathway being constructed and arranged to conduct the fibers to the said duct and to permit said particles of foreign materials to separate from the fibers by gravity and fall away therefrom while the fibers are passing to said duct, and pneumatic means acting transversely of said pathway for supplementing the sustaining action of said first mentioned stream of air by providing additional streams.

7. The combination of the devices for taking cotton fibers from a mass of cotton and separating them from each other and from cotton seed or other relatively large particles of foreign materials, a duct for finally receiving said fibers, means enclosing a relatively elongated horizontal pathway between the aforesaid separating means and said duct, a blast mechanism arranged to cause an air blast to force the fibers and the relatively small particles of foreign materials from the separating means toward the said pathway, a suction mechanism arranged to cause a stream of air to move from the initial separating means and carry the fibers and the said particles of foreign materials along said pathway into said duct, the devices which form said pathway being arranged to permit the said particles of foreign materials to separate by gravity from the fibers while the latter are approaching said duct, and means for causing supplemental streams of air to pass across said pathway and thereby to supplement the sustaining action of said air blast.

8. In an apparatus of the class described, the combination with the devices for taking cotton fibers from a mass of cotton and separating them from each other, and the relatively remote duct for finally receiving the fibers, of the separator element in said apparatus interposed between the initial separating means and said duct, said element comprising a main chamber and a plurality of sub-chambers and having a relatively elongated horizontal pathway above said sub-chambers, a duct connecting the initial separating mechanism and the chamber in the separator, a pneumatic mechanism arranged to cause a stream of air to take the fibers and the smaller particles of foreign materials together away from the separating mechanism and along said pathway, the devices which form the said chambers being arranged to permit the particles of foreign materials to separate and form varying graduated masses while the fibers are being carried to the said duct, and means for directing a plurality of separate air streams across the said pathway to supplement the sustaining action of said stream of air which carries the fibers along the pathway.

9. The combination with the saws adapted to separate the cotton fibers from each other and from relatively large quantities of foreign material commingled with the cotton, a duct for finally receiving said fibers, means enclosing a relatively elongated horizontal pathway between said saws and said duct, and a pneumatic mechanism arranged to cause a stream of air to take the fibers and the smaller particles of foreign material from the saws and convey them together along said pathway, the devices which define the pathway being arranged to guide the fibers to said duct and to permit said particles of foreign material to separate by gravity from the fiber, and means for supplying supplemental vertically moving streams of air below said pathway.

10. The combination of the separating devices adapted to separate the fibers from each other, a duct for finally receiving said fibers, means enclosing a relatively elongated horizontal pathway between the initial fiber separating means and the said duct, a pneumatic mechanism arranged to cause a stream of air to take the fibers and the smaller particles of foreign materials from the separating means and convey them together along said pathway, the devices which define the pathway being arranged to permit the air stream to carry the cotton fibers to the said duct and permit said particles of foreign materials to separate by gravity from the fibers, and means for supplying variable supplemental streams of air along said pathway to assist in sustaining the fibers.

In testimony whereof, I affix my signature.

JAMES C. GARNER.